United States Patent [19]

Negishi

[11] Patent Number: 5,507,155
[45] Date of Patent: Apr. 16, 1996

[54] COMPRESSOR CONTROL APPARATUS AND METHOD FOR AN AUTOMOBILE AIR-CONDITIONING SYSTEM

[75] Inventor: Yasutaka Negishi, Konan, Japan

[73] Assignee: Zexel Corporation, Tokyo, Japan

[21] Appl. No.: 337,029

[22] Filed: Nov. 7, 1994

[30] Foreign Application Priority Data

Nov. 12, 1993 [JP] Japan .................... 5-307141

[51] Int. Cl.$^6$ .................................................. B60H 1/00
[52] U.S. Cl. .................... 62/228.4; 62/228.3; 62/229; 62/244
[58] Field of Search .................. 62/228.4, 228.1, 62/228.3, 228.5, 229, 243, 244, 323.3, 323.4, 323.1, 160, 208, 209, 226, 215

[56] References Cited

U.S. PATENT DOCUMENTS

| | | | |
|---|---|---|---|
| 4,257,238 | 3/1981 | Kountz et al. | 62/229 X |
| 4,667,480 | 5/1987 | Bessler | 62/228.4 X |
| 4,926,653 | 5/1990 | Masuda et al. | 62/228.4 X |
| 5,263,335 | 11/1993 | Isono et al. | 62/229 X |

FOREIGN PATENT DOCUMENTS 61-101020  6/1986  Japan .
3-213956  9/1991  Japan .

Primary Examiner—Harry B. Tanner

[57] ABSTRACT

An automobile air-conditioning system has a compressor driven by an electric motor, a main condenser for cooling which is provided outside a car-room, a subcondenser for heating which is provided in the car-room, an evaporator provided in the car-room and a changeover valve for switching refrigerant paths, and executes a heating operation and a cooling operation by switching refrigerant paths by the changeover valve. When an air-conditioning mode is a heating mode and a room temperature of the automobile is below a prescribed temperature, a revolution of the compressor is compensated by a first prescribed revolution pitch according to a discharge temperature of a refrigerant delivered from the compressor. When the air-conditioning mode is the heating mode and the room temperature of the automobile is above the prescribed temperature, the revolution of the compressor is compensated by a second prescribed revolution pitch which is larger than the first prescribed revolution pitch according to the discharge temperature of the refrigerant delivered from the compressor.

26 Claims, 4 Drawing Sheets

COMPRESSOR CONTROL APPARATUS AND METHOD FOR AN AUTOMOBILE AIR-CONDITIONING SYSTEM

BACKGROUND OF THE INVENTION

The present invention relates to a compressor control apparatus and method for an automobile air-conditioning system, in particular, relates to an apparatus and method for controlling a compressor that is driven by an electric motor.

In an air-conditioning system having a compressor that is driven by an electric motor, as a capability of a heat exchanger is dropped when a discharge temperature of a refrigerant that is delivered from the compressor increases too much, an increase in the discharge temperature of the refrigerant that is delivered from the compressor is restricted. In the case of an air-conditioning system shown in the Japanese Patent Laid Open Publication No. 3-213956, a discharge temperature of a refrigerant that is delivered from a compressor is detected, and a revolution of the compressor is decreased by a prescribed revolution when a detected discharge temperature of the refrigerant is above a prescribed temperature. Hereby, an increase in the discharge temperature of the refrigerant that is delivered from the compressor is restricted.

If a revolution compensation of a compressor like this is applied to an automobile air-conditioning system of FIG. 4 that has an evaporator and a sub-condenser for heating in a car-room, a problem as described below may occur when an air-conditioning mode is a heating mode. That is, when a room temperature becomes 10° C. or higher during the heating mode, a refrigerant pressure rises in a high-pressure side of the air-conditioning system even though a revolution of the compressor is decreased to cope with rise in a discharge temperature of the refrigerant, and the compressor is shut down by an operation of a pressure switch of the air-conditioning system. This is ascribed to reasons that a temperature of the air that flows into the subcondenser for heating is increased and that the subcondenser for heating cannot be scaled up in capacity in order to be provided in the car-room.

FIG. 4 shows an example of a conventional automobile air-conditioning system having an evaporator and a subcondenser for heating in a car-room. In FIG. 4, a reference numeral 1 is a compressor driven by an electric motor, a reference numeral 2 is an evaporator, a reference numeral 3 is a sub-condenser for heating, a reference numeral 4 is a main condenser for cooling, and a reference numeral 5 is a changeover valve. The compressor 1 at its suction port is connected to an outlet of the evaporator 2 via a refrigerant tube 6, and a delivery outlet thereof is connected to an inlet of the changeover valve 5 via a refrigerant tube 7. An inlet of the evaporator 2 is connected to an outlet of the main condenser 4 via a refrigerant tube 10 that has an expansion valve 8 and a receiver 9. The sub-condenser 3 at its inlet is connected to one outlet of the changeover valve 5 via a refrigerant tube 11, and an outlet thereof is connected to the inlet of the evaporator 2 via a refrigerant tube 13 that has an expansion valve 12. An inlet of the main condenser 4 is connected to the other outlet of the changeover valve 5 via a refrigerant tube 14. A reference numeral 15 is a discharge temperature sensor for detecting a discharge temperature of the refrigerant of the compressor 1. The discharge temperature sensor 15 is provided at the refrigerant tube 7 between the compressor 1 and the changeover valve 5. A reference numeral 16 is a pressure switch that operates when a refrigerant pressure in the high-pressure side of the air-conditioning system becomes above a prescribed high pressure value. The pressure switch 16 is provided at the refrigerant tube 13 between the subcondenser 3 and the expansion valve 12. The compressor 1 is shut down by an operation of the pressure switch 16. The evaporator 2 and the sub-condenser 3 are provided in a car-room 17, and the main condenser 4 is provided outside the car-room. A reference numeral 18 is a blower that is provided in the car-room 17. In a composition as described above, a heating operation and a cooling operation are carried out by switching the changeover valve 5. In the heating operation, a refrigerant path is formed, which begins from the compressor 1, passes through the changeover valve 5, the sub-condenser 3 for heating and the evaporator 2, and then returns to the compressor 1. In the cooling operation, a refrigerant path is formed, which begins from the compressor 1, passes through the changeover valve 5, the main condenser 4 and evaporator 2, and then returns to the compressor 1. In the heating operation, the air blown by the blower 18 is cooled by the evaporator 2 and then heated by the sub-condenser 3 for heating. Thereby, accordingly as the room temperature of the automobile rises, the air temperature rises in an air outlet side of the evaporator 2, that is, the air temperature rises in an air inlet side of the sub-condenser 3, and the refrigerant pressure rises in a refrigerant outlet or a high-pressure side of the subcondenser 3. As the sub-condenser 3 for heating is provided in the car-room, it cannot be scaled up in capacity. Thus, compared with the main condenser 4, the sub-condenser 3 easily increases the refrigerant pressure in the high-pressure side.

The conventional revolution compensation described above is applied to the automobile air-conditioning system of FIG. 4 so that the revolution of the compressor 1 is decreased by the prescribed revolution when the refrigerant discharge temperature is high. According to this, however, when the room temperature rises exceeding 10° C. during the heating operation, a rise in refrigerant pressure in the high-pressure side is not restricted and it reaches the prescribed high pressure value, and thus the pressure switch 16 operates. To avoid this, the prescribed revolution mentioned above is increased in order to restrict the rise in refrigerant pressure in the high-pressure side, and the revolution of the compressor 1 must be decreased on a large scale when the refrigerant discharge temperature becomes high. According to this, however, when the room temperature is still low in the heating operation, a cold air is blown out due to a drop in the capability of the sub-condenser 3 for heating which is caused by a great decrease in revolution of the compressor 1, though the car-room has become warmed up, and thus a favorable heating cannot be attained.

Further, in the case of the automobile air-conditioning system of FIG. 4, as the compressor 1 is shut down by a rise in refrigerant pressure in the high-pressure side when the room temperature becomes 10° C. or higher in the heating mode as described above, a maximum revolution of the compressor 1 is inevitably set lower to restrict the rise in refrigerant pressure in the high-pressure side. Thus, when the room temperature is low, the heating capability is inferior and a favorable heating cannot be attained.

SUMMARY OF THE INVENTION

It is an object of the present invention to provide an improved compressor control apparatus and method for an automobile air-conditioning system.

Another object of the present invention is to provide a compressor control apparatus and method which can prevent a compressor shutdown due to a rise in refrigerant pressure during heating.

Still another object of the present invention is to provide a compressor control apparatus and method which can attain comfortable heating condition.

According to the present invention, when an air-conditioning mode is a heating mode and a room temperature of an automobile is below a prescribed temperature, a revolution of a compressor is compensated by a first prescribed revolution pitch according to a discharge temperature of a refrigerant which is delivered from the compressor driven by an electric motor. When the air-conditioning mode is the heating mode and the room temperature of the automobile is above the prescribed temperature, the revolution of the compressor is compensated by a second prescribed revolution pitch which is larger than the first prescribed revolution pitch according to the discharge temperature of the refrigerant which is delivered from the compressor. When the room temperature of the automobile is below the prescribed temperature, since the revolution of the compressor is compensated by the smaller revolution pitch, heating condition is not degraded. When the room temperature of the automobile is above the prescribed temperature, since the revolution of the compressor is compensated by the larger revolution pitch, a rise in refrigerant pressure in the high-pressure side can be restricted. Thereby, a shutdown of the compressor due to a rise in refrigerant pressure in the high-pressure side can be avoided during heating, and yet a favorable heating condition can be attained regardless of room temperatures.

Also, according to the present invention, in the case in which the air-conditioning mode is the heating mode, a maximum revolution of the compressor driven by the electric motor is set high while the room temperature of the automobile is low, and the maximum revolution is set lower accordingly as the room temperature of the automobile rises. As the maximum revolution of the compressor is set high when the room temperature of the automobile is low, it is possible to increase a heating capability when a room temperature is low. Likewise, as the maximum revolution is set lower accordingly as the room temperature rises, a rise in refrigerant pressure in the high-pressure side can be restricted. Thereby, a shutdown of the compressor due to a rise in refrigerant pressure in the high-pressure side during heating can be avoided, and yet a favorable heating condition can be attained regardless of room temperatures. Moreover, as the maximum revolution is set lower accordingly as the room temperature rises, a saving energy can also be attained.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
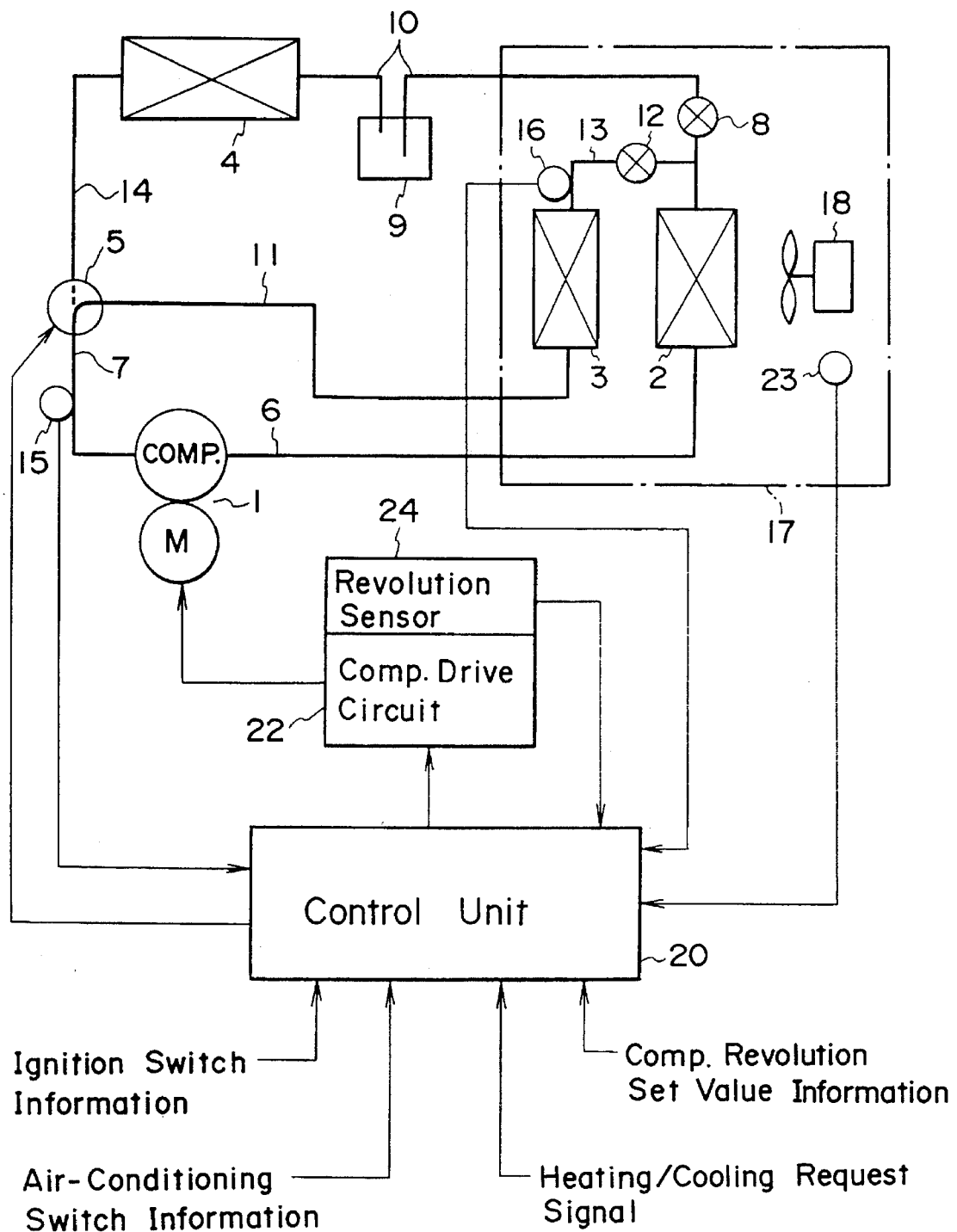
FIG. 1 is a block diagram showing a composition of the present invention.
Figure 4:
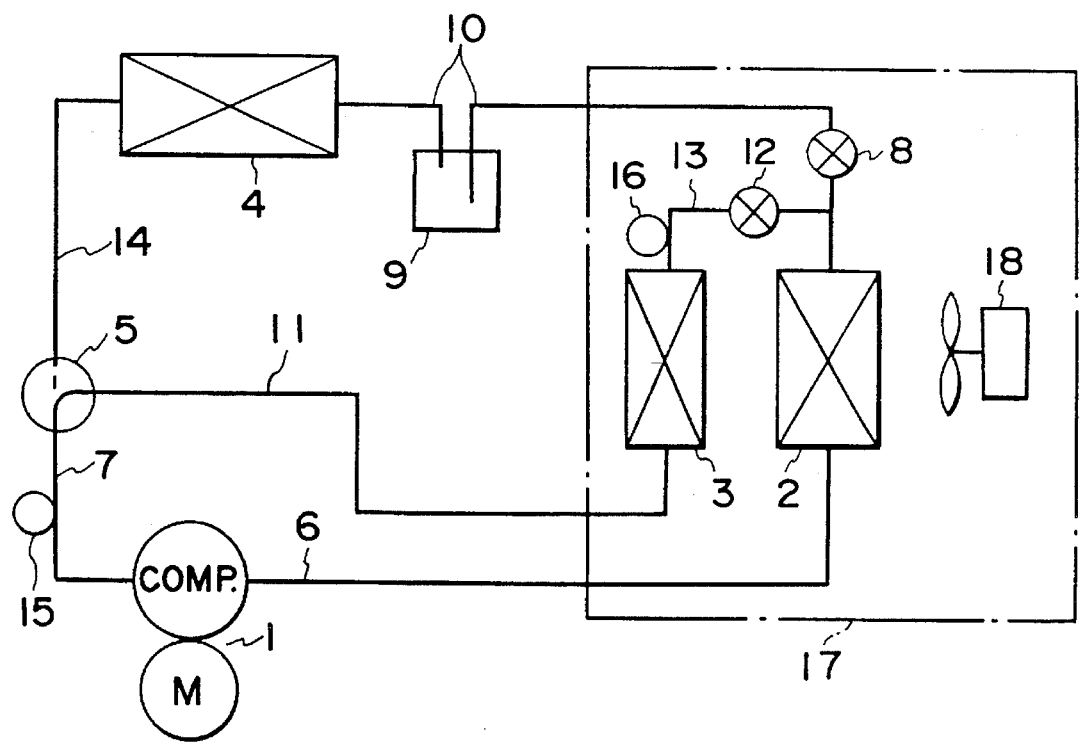
FIG. 4 is a drawing showing an example of a conventional automobile air-conditioning system which has an evaporator and a sub-condenser for heating in a car-room.

FIG. 1 is a block diagram showing an embodiment of the present invention. In FIG. 1, components that are given the same reference numerals as those of FIG. 4 indicate the same.

In FIG. 1, a reference numeral 20 is a control unit, and a reference numeral 22 is a compressor drive circuit. The control unit 20 controls the compressor 1 driven by the electric motor via the compressor drive circuit 22, and executes switching between heating/cooling by controlling the changeover valve 5. The control unit 20 receives a refrigerant discharge temperature Td from the discharge temperature sensor 15, an on/off signal from the pressure switch 16, a room temperature Tinc from a temperature sensor 23 which is provided in the car-room 17 and an actual revolution from a revolution sensor 24 which detects a revolution of the compressor 1, as well as an ignition switch information, an air-conditioning switch information, a heating/cooling request signal, and a compressor revolution set value information. As described in FIG. 4, the discharge temperature sensor 15 detects the discharge temperature Td of the refrigerant that is delivered from the compressor 1, and the pressure switch 16 is turned on when the refrigerant pressure in the high-pressure side of the air-conditioning system reaches the prescribed high pressure value. The ignition switch information is an on/off information of an ignition switch which is not shown on the drawing. The air-conditioning switch information is an on/off information of an air-conditioning switch which is not shown on the drawing. The heating/cooling request signal is a signal for requesting a heating or a cooling operation. The compressor revolution set value information is an information representing a set revolution of the compressor 1. The set revolution of the compressor 1 can be varied. Contents of the automobile air-conditioning system that is composed of the compressor 1, evaporator 2, subcondenser 3 for heating, main condenser 4 and the changeover valve 5 are as described in FIG. 4.

Figure 2:
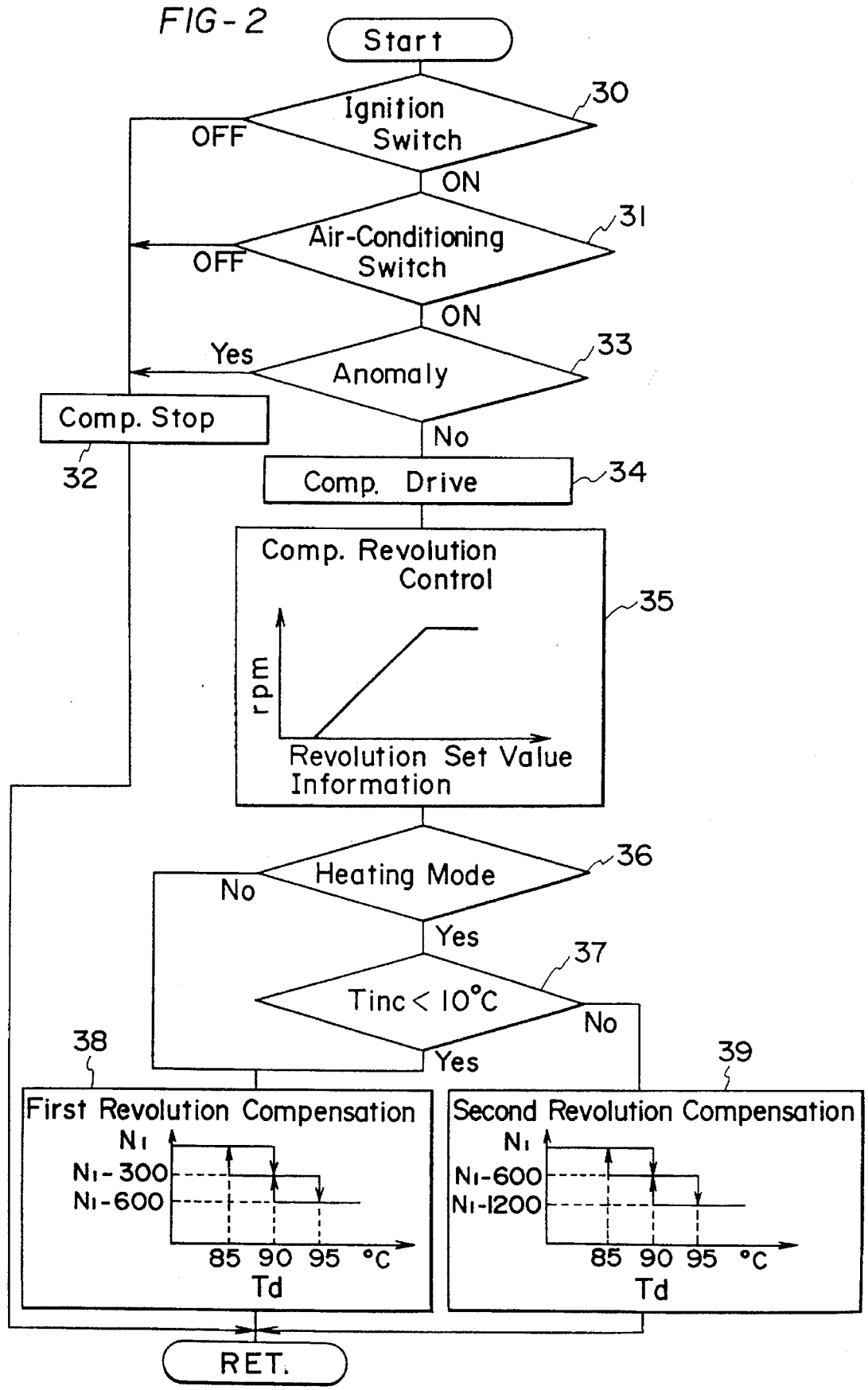
FIG. 2 is a flow diagram showing a control unit of FIG. 1, and it shows a first preferred embodiment of the present invention.

FIG. 2 is a flowchart of the control unit 20 of FIG. 1. The first preferred embodiment of the present invention is explained using FIG. 2.

The control unit 20 judges the on/off condition of the ignition switch and the air-conditioning switch based on the ignition switch information and the air-conditioning switch information at steps 30 and 31. If at least either one of the ignition switch or the air-conditioning switch is off, the control unit 20 returns to the step 30 through a compressor shutdown processing of a step 32. If both the ignition switch and the air-conditioning switch are on, the control unit 20 enters a step 33. At the step 33, the on/off condition of the pressure switch 16 and whether the refrigerant discharge temperature Td from the discharge temperature sensor 15 is $Td \geq 120°$ C. are judged. If the pressure switch 16 is on and/or the refrigerant discharge temperature Td is $Td \geq 120°$ C., the control unit 20, recognizing it an anomaly, enters the step 32 and returns to the step 30 through the compressor shutdown processing of the step 32. If the pressure switch 16 is off and the refrigerant discharge temperature Td is not $Td \leq 120°$ C. the control unit 20 recognizes it normal and enters a step 34.

The control unit 20 drives the compressor 1 via the compressor drive circuit 22 at the step 34 and enters a step 35. At the step 35, the control unit 20, based on the compressor revolution set value information and the actual revolution of the revolution sensor 24, controls the compressor 1 via the compressor drive circuit 22 so that the compressor 1 attains a set revolution N1 that is given by the compressor revolution set value information.

The control unit 20 enters a step 36 after the step 35, and judges whether the air-condition mode is the heating mode based on the heating/cooling request signal. If the air-conditioning mode is the heating mode, the control unit 20 enters a step 37 from the step 36, takes the room temperature Tinc from the room temperature sensor 23 and judges whether the room temperature Tinc is below 10° C. If the room temperature Tinc is Tinc<10° C. the control unit 20 enters a step 38 from the step 37, takes the refrigerant discharge temperature Td from the discharge temperature sensor 15, and executes a revolution compensation for the compressor 1 according to the refrigerant discharge temperature Td using a first revolution compensation map. If the room temperature Tinc is not Tinc<10° C. the control unit 20 enters a step 39 from the step 37, takes the refrigerant discharge temperature Td from the discharge temperature sensor 15, and executes a revolution compensation for the compressor 1 according to the refrigerant discharge temperature Td using a second revolution compensation map.

The first revolution compensation map, when the refrigerant discharge temperature Td rises and reaches 90° C., compensates the revolution of the compressor 1 to N1—300 rpm by decreasing it by 300 rpm from the set revolution N1. When the refrigerant discharge temperature Td further rises and reaches 95° C., the revolution of the compressor 1 is further decreased by 300 rpm and compensated to N1—600 rpm. That is, when the refrigerant discharge temperature Td rises above 90° C. the first revolution compensation map decreases the revolution of the compressor 1 with a revolution pitch of 300 rpm/5° C. When the refrigerant discharge temperature Td drops from 95° C. to 90° C. by a decrease in revolution of the compressor 1, the revolution of the compressor 1 is increased by 300 rpm and compensated to N1—300 rpm. When the refrigerant discharge temperature Td further drops to 85° C., the revolution of the compressor 1 is further increased by 300 rpm and returned to the set revolution N1. That is, when the refrigerant discharge temperature Td that has risen above 90° C. drops, the first revolution compensation map increases the revolution of the compressor 1 with a revolution pitch of 300 rpm/5° C. through a hysteresis of 5° C.

The second revolution compensation map, when the refrigerant discharge temperature Td rises and reaches 90° C., compensates the revolution of the compressor 1 to N1—600 rpm by decreasing it by 600 rpm from the set revolution N1. When the refrigerant discharge temperature Td further rises and reaches 95° C., the revolution of the compressor 1 is further decreased by 600 rpm and compensated to N1—1200 rpm. That is, when the refrigerant discharge temperature Td rises above 90° C. the second revolution compensation map decreases the revolution of the compressor 1 with a revolution pitch of 600 rpm/5° C. which is twice the revolution pitch of the first revolution compensation map. When the refrigerant discharge temperature Td drops from 95° C. to 90° C. by a decrease in revolution of the compressor 1, the revolution of the compressor 1 is increased by 600 rpm and compensated to N1—600 rpm. When the refrigerant discharge temperature Td further drops to 85° C., the revolution of the compressor 1 is further increased by 600 rpm and returned to the set revolution N1. That is, when the refrigerant discharge temperature Td that has risen above 90° C. drops, the second revolution compensation map increases the revolution of the compressor 1 with a revolution pitch of 600 rpm/5° C. through a hysteresis of 5° C.

When the room temperature Tinc is below 10° C., the first revolution compensation map is selected, and the revolution of the compressor 1 is compensated with a small revolution pitch of 300 rpm. Thereby, as a capability drop of the compressor 1 is small when the room temperature is below 10° C., an aggravation of heating condition can be avoided. When the room temperature Tinc is above 10° C. the second revolution compensation map is selected, and the revolution of the compressor 1 is compensated with a large revolution pitch of 600 rpm. Thereby, a rise in refrigerant pressure in the high-pressure side of the air-conditioning system can be restricted. In this instance, as the car-room is above 10° C. in temperature, heating condition is not so much degraded even by decreasing the revolution of the compressor 1 with the large revolution pitch. After the revolution compensation at the step 38 or the step 39, the control unit 20 returns to the step 30. If the air-conditioning mode is not the heating mode at the step 36, the control unit 20 enters from the step 36 to the step 38, and returns to the step 30 through the revolution compensation according to the first revolution compensation map. During cooling, as the capacity of the main condenser 4 is large, it is not necessary to give consideration to a rise in refrigerant pressure in the high-pressure side like the case of the sub-condenser 3 for heating.

Figure 3:
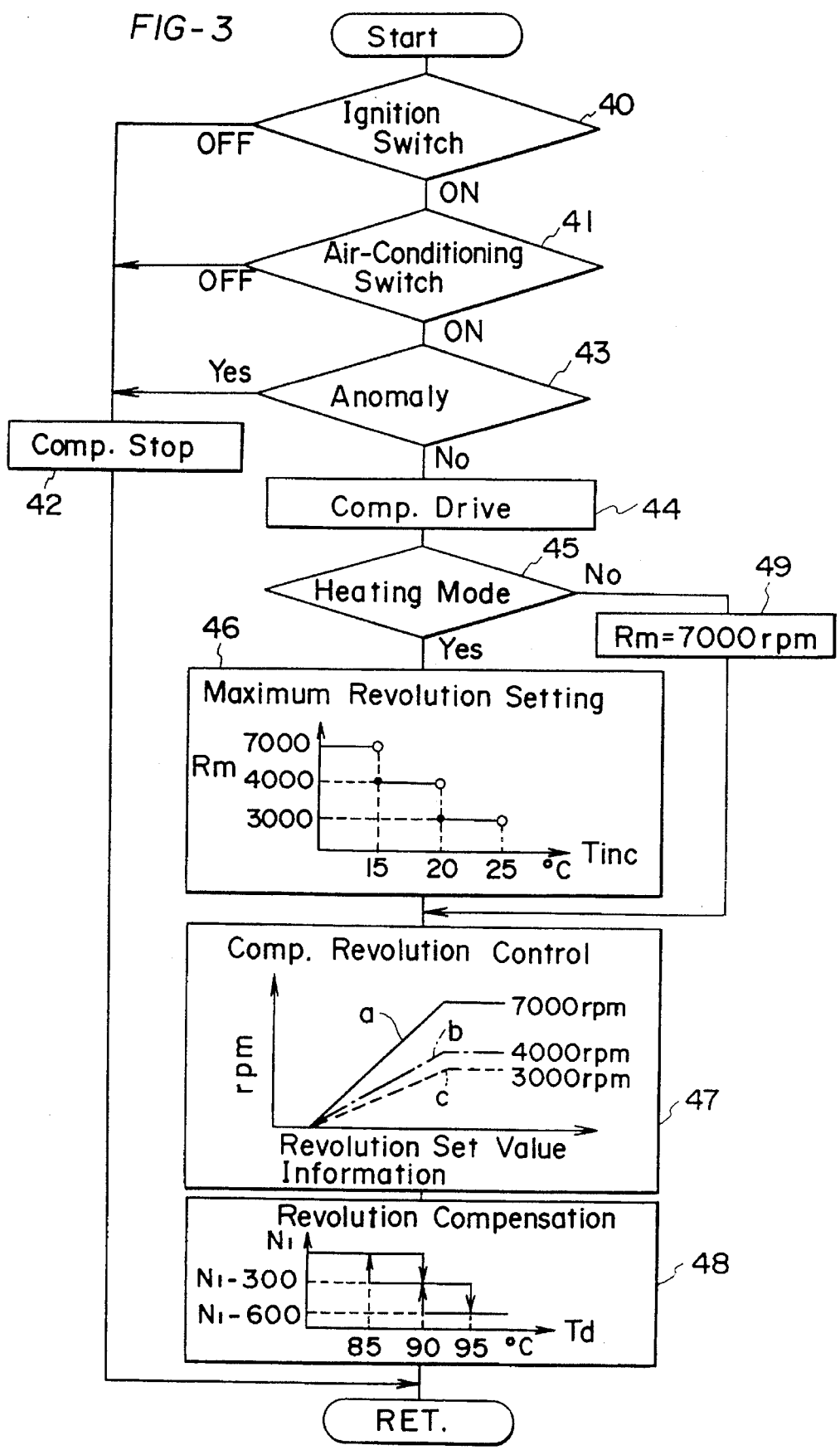
FIG. 3 is a flow diagram of the control unit of FIG. 1, and it shows a second preferred embodiment of the present invention.

FIG. 3 is a flowchart of the control unit 20 of FIG. 1 showing another preferred embodiment. The second preferred embodiment of the present invention is explained using FIG. 2.

The control unit 20 judges the on/off condition of the ignition switch and the air-conditioning switch based on the ignition switch information and the air-conditioning switch information at steps 40 and 41. If at least either one of the ignition switch or the air-conditioning switch is off, the control unit 20 returns to the step 40 through a compressor shutdown processing of a step 42. If both the ignition switch and the air-conditioning switch are on, the control unit 20 enters a step 43. At the step 43, the on/off condition of the pressure switch 16 and whether the refrigerant discharge temperature Td is Td≧120° C. are judged. If the pressure switch 16 is on and/or the refrigerant discharge temperature Td is Td≧120° C., the control unit 20, recognizing it an anomaly, enters the step 42 and returns to the step 40 through the compressor shutdown processing of the step 42. If pressure switch 16 is off and the refrigerant discharge temperature Td is not Td≧120° C., the control unit 20 recognizes it normal and enters a step 44.

The control unit 20 drives the compressor 1 via the compressor drive circuit 22 at the step 44 and enters a step 45. At the step 45, the control unit 20 judges whether the air-conditioning mode is the heating mode based on the heating/cooling request signal. If the air-conditioning mode is the heating mode, the control unit 20 enters a step 46 from the step 45, takes the room temperature Tinc from the room temperature sensor 23, and sets a maximum revolution Rm of the compressor 1 according to a maximum revolution setting map and based on the room temperature Tinc. The maximum revolution setting map sets the maximum revolution Rm high when the room temperature Tinc is low, and sets the maximum revolution Rm lower accordingly as the room temperature Tinc becomes high. In the present embodiment, maximum revolution Rm=7000 rpm is set when the room temperature Tinc<15° C., and maximum revolution Rm= 4000 rpm is set when the room temperature Tinc is 15° C.≦Tinc<20° C. and maximum revolution Rm=3000 rpm is set when the room temperature Tinc is 20° C.≦Tinc<25° C.

The control unit 20 enters a step 47 after the step 46. At the step 47, the control unit 20 selects a revolution control map that corresponds to a set maximum revolution Rm out of revolution control maps (a), (b) and (c). The revolution control map (a) is selected when the maximum revolution Rm=7000 rpm is set, and the revolution control map (b) is selected when the maximum revolution Rm= 4000 rpm is set, and the revolution control map (c) is selected when the maximum revolution Rm=3000 rpm is set. After that, the control unit 20 controls the compressor 1 according to the revolution control map so that the revolution of the compressor 1 becomes the set revolution N1 that is given by the compressor revolution set value information based on the compressor revolution set value information and the actual revolution of the revolution sensor 24.

The control unit 20 enters a step 48 after the step 47. In the step 48, the control unit 20 takes the refrigerant discharge temperature Td from the discharge temperature sensor 15, and executes a revolution compensation of the compressor 1 according to the refrigerant discharge temperature Td using the revolution compensation map. The revolution compensation map compensates the revolution of the compressor 1 to N1—300 rpm by decreasing the set revolution N1 by 300 rpm, when the refrigerant discharge temperature Td rises and reaches 90° C. When the refrigerant discharge temperature Td further rises and reaches 95° C. the revolution of the compressor 1 is further decreased by 300 rpm and compensated to N1—600 rpm. That is, when the refrigerant discharge temperature Td rises above 90° C. the revolution compensation map decreases the revolution of the compressor 1 with a revolution pitch of 300 rpm. When the refrigerant discharge temperature Td drops from 95° C. to 90° C. by a decrease in revolution of the compressor 1, the revolution of the compressor 1 is increased by 300 rpm and compensated to N1—300 rpm. When the refrigerant discharge temperature Td further drops to 85° C., the revolution of the compressor 1 is further increased by 300 rpm and returned to the set revolution N1. That is, when the refrigerant discharge temperature Td that has risen above 90° C. drops, the revolution compensation map increases the revolution of the compressor 1 with a revolution pitch of 300 rpm/5° C. through a hysteresis of 5° C. After the revolution compensation at the step 48, the control unit 20 returns to the step 40.

As the maximum revolution Rm is set high when the room temperature Tinc is low, a heating capability can be raised. Also, as the maximum revolution Rm is set lower accordingly as the room temperature Tinc rises, a rise in refrigerant pressure in the high-pressure side can be restricted. Moreover, as the maximum revolution is set low accordingly as the room temperature Tinc rises, a saving energy can also be attained.

When the air-conditioning mode is not the heating mode at the step 45, the control unit 20 enters a step 49 from the step 45, and returns to the step 47 after setting the maximum revolution Rm=7000 rpm.

According to the first preferred embodiment, the revolution of the compressor is compensated by the first prescribed revolution pitch according to the refrigerant discharge temperature when the air-conditioning mode is the heating mode and the room temperature of the automobile is below the prescribed temperature, and the revolution of the compressor is compensated by the second prescribed revolution pitch which is larger than the first prescribed revolution pitch according to the refrigerant discharge temperature when the air-conditioning mode is the heating mode and the room temperature of the automobile is above the prescribed temperature. Since the revolution of the compressor is compensated with a small revolution pitch when the room temperature is below the prescribed temperature, the heating condition is not degraded. Likewise, since the revolution of the compressor is compensated with a large revolution pitch when the room temperature is above the prescribed temperature, a rise in refrigerant pressure in the high-pressure side can be restricted. Thereby, a shutdown of the compressor due to a rise in refrigerant pressure in the high-pressure side can be avoided during heating, and yet a favorable heating condition can be attained regardless of room temperatures.

According to the second preferred embodiment, when the air-conditioning mode is the heating mode, the maximum revolution of the compressor is set high if the room temperature of the automobile is low, and it is set lower accordingly as the room temperature of the automobile rises. As the maximum revolution is set high when the room temperature is low, the heating capability can be raised when the room temperature is low. Also, as the maximum revolution is set lower accordingly as the room temperature rises, a rise in refrigerant pressure in the high-pressure side can be restricted. Thereby, a shutdown of the compressor due to a rise in refrigerant pressure in the high-pressure side can be avoided during heating, and yet a favorable heating condition can be attained regardless of room temperatures. Moreover, as the maximum revolution is set lower accordingly as the room temperature rises, a saving energy can also be attained.

From the foregoing it will now be apparent that a new and improved compressor control for an automobile air-conditioning system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A compressor control apparatus for an automobile air-conditioning system having a compressor driven by an electric motor, a main condenser for cooling which is provided outside a car-room, a sub-condenser for heating which is provided in the car-room, an evaporator provided in the car-room, and a changeover valve for switching between refrigerant paths, and performing a heating operation and a cooling operation by switching the refrigerant paths by said changeover valve, comprising;

air-conditioning mode judging means for judging whether an air-conditioning mode is a heating mode;

room temperature detecting means for detecting whether a room temperature of the automobile is below a prescribed room temperature;

refrigerant discharge temperature detecting means for detecting a discharge temperature of a refrigerant delivered from said compressor;

first revolution compensating means, responsive to said air-conditioning mode judging means, said room temperature detecting means and said refrigerant discharge temperature detecting means, for compensating a revolution of said compressor with a first prescribed revolution pitch according to the refrigerant discharge temperature detected by said refrigerant discharge temperature detecting means when the air-condition mode is the heating mode and the room temperature of the automobile is below said prescribed room temperature;

second revolution compensating means, responsive to said air-conditioning mode judging means, said room temperature detecting means and said refrigerant discharge temperature detecting means, for compensating the revolution of said compressor with a second prescribed revolution pitch, which is larger than said first prescribed revolution pitch, according to the refrigerant discharge temperature detected by said refrigerant discharge temperature detecting means when the air-condition mode is the heating mode and the room temperature of the automobile is above said prescribed room temperature.

2. The apparatus as claimed in claim 1, wherein said prescribed room temperature is a low temperature of around 10° C.

3. The apparatus as claimed in claim 1, wherein said first revolution compensating means decreases the revolution of said compressor by said first prescribed revolution pitch when the refrigerant discharge temperature rises and reaches the first prescribed refrigerant temperature, and decreases the revolution of said compressor with said first prescribed revolution pitch each time the refrigerant temperature rises by a prescribed temperature if the refrigerant discharge temperature further rises; and wherein said second revolution compensating means decreases the revolution of said compressor by said second prescribed revolution pitch when the refrigerant discharge temperature rises and reaches the first prescribed refrigerant temperature, and decreases the revolution of said compressor with said second prescribed revolution pitch each time the refrigerant temperature rises by said prescribed temperature if the refrigerant discharge temperature further rises.

4. The apparatus as claimed in claim 3, wherein said first revolution compensating means increases the revolution of said compressor with said first prescribed revolution pitch each time the refrigerant discharge temperature drops by said prescribed temperature when the refrigerant discharge temperature that has risen above said first prescribed refrigerant temperature drops, and returns the revolution of said compressor to the revolution before the compensation when the refrigerant discharge temperature reaches the second prescribed refrigerant temperature which is lower than said first prescribed refrigerant temperature by said prescribed temperature; and wherein said second revolution compensating means increases the revolution of said compressor with said second prescribed revolution pitch each time the refrigerant discharge temperature drops by said prescribed temperature when the refrigerant discharge temperature that has risen above said first prescribed refrigerant temperature, and returns the revolution of said compressor to the revolution before the compensation when the refrigerant discharge temperature reaches the second prescribed refrigerant temperature which is lower than said first prescribed refrigerant temperature by said prescribed temperature.

5. The apparatus as claimed in claim 1, wherein the revolution of said compressor is compensated by said first revolution compensating means when said air-conditioning mode judging means judges that the air-conditioning mode is not the heating mode.

6. The apparatus as claimed in claim 1 further including;

a pressure switch which is made on when a refrigerant pressure in the high-pressure side of the automobile air-conditioning system becomes a prescribed high-pressure value; and stopping means, responsive to said pressure switch and said refrigerant discharge temperature detecting means, for stopping said compressor when said pressure switch is made on and/or the refrigerant discharge temperature becomes above a prescribed temperature.

7. A compressor control method for an automobile air-conditioning system having a compressor driven by an electric motor, a main condenser for cooling which is provided outside a car-room, a sub-condenser for heating which is provided in the car-room, an evaporator provided in the car-room and a changeover valve for switching refrigerant paths, and performing a heating operation and a cooling operation by switching refrigerant paths by said changeover valve, comprising the steps of:

(a) judging whether an air-conditioning mode is a heating mode;

(b) detecting whether a room temperature of the automobile is a prescribed room temperature;

(c) detecting a discharge temperature of a refrigerant delivered from said compressor;

(d) compensating a revolution of said compressor by a first prescribed revolution pitch according to the detected refrigerant discharge temperature when the air-conditioning mode is the heating mode and the room temperature of the automobile is below the prescribed room temperature; and (e) compensating the revolution of said compressor by a second prescribed revolution pitch which is larger than said first prescribed revolution pitch according to the detected refrigerant discharge temperature when the air-conditioning mode is the heating mode and the room temperature of the automobile is above the prescribed room temperature.

8. The method as claimed in claim 7, wherein said prescribed room temperature is around 10° C.

9. The method as claimed in claim 7, wherein the compensation of said step (d) decreases the revolution of said compressor by said first prescribed revolution pitch when the refrigerant discharge temperature rises and reaches the first prescribed refrigerant temperature, and decreases the revolution of said compressor with said first prescribed revolution pitch each time the refrigerant temperature rises by a prescribed temperature when the refrigerant discharge temperature further rises; and wherein the compensation of said step (e) decreases the revolution of said compressor by said second prescribed revolution pitch when the refrigerant discharge temperature rises and reaches the first prescribed refrigerant temperature, and decreases the revolution of said compressor with said second prescribed revolution pitch each time the refrigerant temperature rises by said prescribed temperature when the refrigerant discharge temperature further rises.

10. The method as claimed in claim 9, wherein the compensation of said step (d) increases the revolution of said compressor with said first prescribed revolution pitch each time the refrigerant discharge temperature drops by said prescribed temperature when the refrigerant discharge temperature that has risen above said first prescribed refrigerant temperature drops, and returns the revolution of said compressor to the revolution before compensation when the refrigerant discharge temperature reaches a second prescribed refrigerant temperature which is lower than said first prescribed refrigerant temperature by said prescribed temperature; and wherein the compensation of said step (e) increases the revolution of said compressor with said second prescribed revolution pitch each time the refrigerant discharge temperature drops by said prescribed temperature when the refrigerant discharge temperature that has risen above said first prescribed refrigerant temperature drops, and returns the revolution of said compressor to the revolution before compensation when the refrigerant discharge temperature reaches the second prescribed refrigerant temperature which is lower than said first prescribed refrigerant temperature by said prescribed temperature.

11. The method as claimed in claim 7, wherein the revolution of said compressor is compensated by means of said step (d) when the air-conditioning mode is not the heating mode.

12. The method as claimed in claim 7 further including the steps of:

(f) detecting whether the refrigerant pressure in a high-pressure side of the automobile air-conditioning system has reached a prescribed high pressure; and (g) stopping said compressor when the refrigerant pressure in the high-pressure side of the automobile air-conditioning system has reached said prescribed high pressure and/or the refrigerant discharge temperature is above a prescribed temperature.

13. A compressor control apparatus for an automobile air-conditioning system having a compressor driven by an electric motor, a main condenser for cooling which is provided outside a car-room, a sub-condenser for heating which is provided in the car-room, an evaporator provided in the car-room, and a changeover valve for switching between refrigerant paths, and performing a heating operation and a cooling operation by switching the refrigerant paths by said changeover valve, comprising;

air-conditioning mode judging means for judging whether an air-conditioning mode is a heating mode;

room-temperature detecting means for detecting a room temperature of an automobile;

maximum revolution setting means, responsive to said air-conditioning mode judging means and said room temperature detecting means, for setting a maximum revolution of said compressor based on a room temperature of the automobile detected by said room temperature detecting means when the air-conditioning mode is the heating mode, said maximum revolution setting means setting the maximum revolution of said compressor high when the room temperature of the automobile is low, and setting the maximum revolution of said compressor lower accordingly as the room temperature of the automobile rises; and revolution controlling means, responsive to said maximum revolution setting means, for controlling the revolution of said compressor so that the set maximum revolution is not exceeded.

14. The apparatus as claimed in claim 13, wherein said maximum revolution setting means has a plurality of maximum revolutions which are determined corresponding to the room temperatures of the automobile, said maximum revolutions are set so that they decrease accordingly as the room temperature of the automobile rises from a low temperature to a high temperature, and said maximum revolution setting means sets the maximum revolution of said compressor by selecting one of said maximum revolutions that corresponds to the room temperature of the automobile which is detected by said room temperature detecting means.

15. The apparatus as claimed in claim 14, wherein said revolution controlling means has a plurality of revolution control characteristics corresponding to said maximum revolutions, selects a revolution control characteristic that corresponds to the maximum revolution set by said maximum revolution setting means, and controls said compressor according to the selected revolution control characteristic.

16. The apparatus as claimed in claim 13 further including:

refrigerant discharge temperature detecting means for detecting a discharge temperature of the refrigerant discharged from said compressor; and revolution compensating means, responsive to said revolution controlling means, for compensating the revolution of said compressor with a prescribed revolution pitch according to a refrigerant discharge temperature detected by said refrigerant discharge temperature detecting means.

17. The apparatus as claimed in claim 16, wherein said revolution compensating means decreases the revolution of said compressor by said prescribed revolution pitch when the refrigerant discharge temperature rises and reaches a first prescribed refrigerant temperature, and decreases the revolution of said compressor with said prescribed revolution pitch each time the refrigerant temperature rises by a prescribed temperature, and said revolution compensating means increases the revolution of said compressor with said prescribed revolution pitch each time the refrigerant discharge temperature drops by said prescribed temperature when the refrigerant discharge temperature that has risen above said first prescribed refrigerant temperature drops, and returns the revolution of said compressor to the revolution before compensation when the refrigerant discharge temperature reaches a second prescribed refrigerant temperature which is lower than said first prescribed temperature by said prescribed temperature.

18. The apparatus as claimed in claim 13, wherein said maximum revolution setting means sets a prescribed maximum revolution when said air-conditioning mode judging means judges that the air-conditioning mode is not the heating mode.

19. The apparatus as claimed in claim 13 further including:

a pressure switch which is made on when a refrigerant pressure in a high-pressure side of the air-conditioning system becomes a prescribed high-pressure value;

refrigerant discharge temperature detecting means for detecting a discharge temperature of the refrigerant delivered from said compressor; and stopping means, responsive to said pressure switch and said refrigerant discharge temperature detecting means, for stopping said compressor when said pressure switch is made on and/or the refrigerant discharge temperature becomes above a prescribed temperature.

20. A compressor control method for an automobile air-conditioning system having a compressor driven by an electric motor, a main condenser for cooling which is provided outside a car-room, a sub-condenser for heating which is provided in the car-room, an evaporator provided in the car-room and a changeover valve for switching refrigerant paths, and performing a heating operation and a cooling operation by switching refrigerant paths by said changeover valve, comprising the steps of:

(a) judging whether an air-conditioning mode is a heating mode;

(b) detecting a room temperature of the automobile;

(c) setting a maximum revolution of said compressor high when the room temperature of the automobile is low, and setting the maximum revolution of said compressor lower accordingly as the room temperature of the automobile rises, in case that the air-conditioning mode is the heating mode; and (d) controlling the revolution of said compressor so that the set maximum revolution is not exceeded.

21. The method as claimed in claim 20, wherein said step (c) has a plurality of maximum revolutions which are determined corresponding to the room temperatures of the automobile, said maximum revolutions are set so that they decrease accordingly as the room temperature of the automobile rises from a low temperature to a high temperature, and said step (c) sets the maximum revolution of said compressor by selecting one of said maximum revolutions that corresponds to the room temperature of the automobile which is detected by said step (b).

22. The method as claimed in claim 21, wherein said step (d) has a plurality of revolution control characteristics corresponding to said maximum revolutions, selects a revolution control characteristic that corresponds to the maximum revolution set by said step (c), and controls said compressor according to the selected revolution control characteristic.

23. The method as claimed in claim 20 further including:

(e) detecting a discharge temperature of the refrigerant delivered from said compressor; and (f) compensating the revolution of said compressor with a prescribed revolution pitch according to the detected refrigerant discharge temperature.

24. The method as claimed in claim 23, wherein said step (f) decreases the revolution of said compressor by said prescribed revolution pitch when the refrigerant discharge temperature reaches the first prescribed refrigerant temperature, and decreases the revolution of said compressor with said prescribed revolution pitch each time the refrigerant temperature rises by a prescribed temperature if the refrigerant discharge temperature further rises, and said step (f) increases the revolution of said compressor with said prescribed revolution pitch each time the refrigerant discharge temperature drops by said prescribed temperature when the refrigerant discharge temperature that has risen above said first prescribed refrigerant temperature drops, and returns the revolution of said compressor to the revolution before the compensation when the refrigerant discharge temperature reaches a second prescribed refrigerant temperature which is lower than said first prescribed refrigerant temperature by said prescribed temperature.

25. The method as claimed in claim 20, wherein said step (c) sets a prescribed maximum revolution when the air-conditioning mode is not the heating mode.

26. The method as claimed in claim 20 further including:

(e) detecting whether a refrigerant pressure in a high-pressure side of the automobile air-conditioning system has reached a prescribed high-pressure value;

(f) detecting a discharge temperature of the refrigerant delivered from said compressor; and (g) stopping said compressor when the refrigerant pressure in the high-pressure side of the automobile air-conditioning system reaches said prescribed high-pressure value and/or the refrigerant discharge temperature becomes above a prescribed temperature.

* * * * *